United States Patent [19]

Bruson et al.

[11] 3,716,487
[45] Feb. 13, 1973

[54] PROCESS FOR THE REMOVAL OF SCALE

[75] Inventors: Herman A. Bruson, Woodridge, Conn.; Henry Gould, Houston, Tex.

[73] Assignee: Milchem Incorporated, Houston, Tex.

[22] Filed: Sept. 23, 1971

[21] Appl. No.: 183,278

[52] U.S. Cl. ....................252/82, 210/58, 252/180
[51] Int. Cl. .............................C02b 5/06, C02b 1/20
[58] Field of Search ............252/82, 87, 180; 210/58

[56] References Cited

UNITED STATES PATENTS

| | | | |
|---|---|---|---|
| 2,386,736 | 10/1945 | Bruson | 260/46 |
| 3,325,410 | 6/1967 | Croltz | 252/87 |
| 3,507,795 | 4/1970 | Gardner | 252/87 |
| 3,661,785 | 5/1972 | DePierri | 210/58 |

Primary Examiner—George F. Lesmes
Assistant Examiner—J. P. Brammer
Attorney—Bertram H. Mann et al.

[57] ABSTRACT

A process for the removal and inhibition of scale in aqueous environments utilizing a composition having the formula:

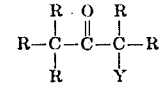

wherein R is —$CH_2$—$CH_2$—COOX, X being a member selected from the class consisting of hydrogen, alkali metals, ammonium and substituted ammonium, and Y is selected from the class consisting of hydrogen and —$CH_2CH_2$—COOX, X being a member selected from the class consisting of hydrogen, alkali metals, ammonium and substituted ammonium.

26 Claims, No Drawings

3,716,487

PROCESS FOR THE REMOVAL OF SCALE

BACKGROUND OF THE INVENTION

1. Field of the invention

The invention relates to a process for the inhibition and removal of scale formation on surfaces having a tendency to attract said scale by utilizing compositions derived by cyanoethylation of acetone with acrylonitrile.

2. Description of the Prior Art

The utilization of aqueous systems which generally contain organic compounds, and the production and processing of hydrocarbons containing such impurities is impaired by the precipitation of these impurities, resulting in the formation of solid material, commonly referred to as "scale." In the case of aqueous environments, the harmful effects of the formation of scale are generally confined to the reduction of the capacity of receptacles and conduits such as boilers, sea water evaporators and the like, which are employed to store, treat and/or convey water. In the case of conduits, the the impedance of flow is a direct result of scale formation. Other consequences are not as obvious and will appear only after significant damage has already occurred. For example, scale formed upon the surfaces of storage vessels and conveying lines for process water may break loose. These large masses of deposit are entrained in and conveyed by the water to damage and clog equipment through which water is passed, i.e., tubes, valves, filters, and screens. Additionally, these deposits may appear in, and detract from, the final product which is derived from the process: for example, paper formed from an aqueous suspension of pulp. Furthermore, when the contaminated water is involved in a heat exchange process, scale will be formed upon the heat exchange surfaces which are contacted by the water. This not only impairs heat transfer efficiency, but will also reduce system flow.

The problem of scale formation is compounded in the production and processing of hydrocarbons generally caused by high levels of scale precipitation and growth. These levels may be supplied by process fluids employed in the production of the petroleum such as drilling fluids, water flooding chemicals employed to pressurize the production formations, and the like. In addition, deposits leached and eroded from producing and adjacent formations such as limestone and from salt solutions or brines which are admixed with crude hydrocarbons often contribute substantially to the formation and accumulation of scale. The tendency of these contaminants to precipitate and form scale is accelerated by changed physical conditions which attend withdrawal of hydrocarbons from producing formations. Specifically, the extension reduction of pressure which results from hydrocarbon withdrawal permits the release of carbon dioxide with the consequent supersaturation of the brines or salt solutions contained by the hydrocarbons.

In addition to increased scale potential, petroleum production and processing are also characterized by a number of phases in which scale formation is particularly troublesome. For example, the precipitation of contaminants is commonly experienced upon the withdrawal of the hydrocarbons from the producing formation and is accelerated by reduction in pressures and brine saturation. As a consequence, plugging of the producing formation, well-strainers, valves, tubings, and the like, is experienced from time to time. Scale is also formed upon surface storage and processing equipment such as pipes, valves, heating coils and tubes, separators, scrubbers, heater-treaters, etc. In many of these processes scale reduces heat transfer and operating efficiency as well as impeding flow and contributing to mechanical failures such as the bending or clogging of pumps and valves.

Other crucial areas for the precipitation and accumulation of scale are saline water evaporators, black liquor evaporators, boilers for the conversion of water to steam and evaporators in which raw sugar juice is concentrated.

In the case of saline evaporators, the evaporation of sea or saline water gives rise to the formation of scale deposits of low thermal conductivity on the heat transfer surfaces of the distillation plant. This causes a reduction in heat transfer coefficients which in turn causes deterioration in plant performance necessitating eventual shutdown of the plant for cleaning. In these heat transfer vessels, scale may be formed whenever scale-forming compounds are present in the feed water. However, the type and composition of the scale may vary. For example, when evaporation of sea water takes place under reduced pressure at boiling temperatures below 148° F, the main scaling material is calcium carbonate. However, at increased temperatures, it is primarily magnesium hydroxide in the form of brucite. Nevertheless, calcium sulfate scale may be formed at all temperatures if the brine concentration is sufficiently high.

When steam generation boilers and similar vessels are operated using water and heat transfer as a processing mechanism in, for example, black liquor evaporation processes, a buildup of scale deposit formation results in decreased overall efficiency. The deposit formation tends to decrease heat transfer requiring an increased heat input to accomplish the desired evaporation. These deposits, which are very similar to those found in sea water evaporators and in lines, storage tanks and the like, and in hydrocarbon production, are primarily organic residues and soluble salts which can be removed by boil-outs with water.

In each of these areas of buildup, while calcium sulfate and calcium carbonate are primary contributors to scale formation, other salts of alkaline-earth metals and the aluminum silicates are also apparent. Magnesium carbonate, barium sulfate and aluminum silicate provided by silts of the bentonitic, illitic and kaolinitic types often pose considerable scale problems in the aqueous and hydrocarbon environments.

It has been surprisingly discovered that organic pentacarboxylic and hexacarboxylic acids and water-soluble salts thereof prepared from cyanoethylated acetone which is subsequently saponified possess extraordinary scale inhibition characteristics for aqueous environments and the like and may be used in a process to prevent and remove scale accumulation in environments having therein chemicals which have a tendency to form said scale.

It is therefore an object of the present invention to provide a new and improved scale inhibition process.

It is a further object of the present invention to provide a process for removal of scale in aqueous environments, on the surfaces of heat exchange vessels, and the like.

Other objects and advantages of the present invention will be readily apparent to those skilled in the art from a reading of the specification and claims which follow.

SUMMARY OF THE INVENTION

The present invention relates to a process for the removal and inhibition of scale in aqueous environments utilizing a composition having the formula:

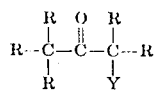

wherein, R is —$CH_2$—$CH_2$—COOX, X being a member selected from the class consisting of hydrogen, alkali metals, ammonium and substituted ammonium, and Y is selected from the class consisting of hydrogen and —$CH_2$—$CH_2$—COOX, X being a member selected from the class consisting of hydrogen, alkali metals, ammonium and substituted ammonium.

DESCRIPTION OF THE PREFERRED EMBODIMENTS

Cyanoethylation of various ketones with acrylonitrile has produced a variety of compositions. For example, it has been disclosed in U.S. Pat. No. 2,386,736, entitled "Cyanoethylation of Ketones," that acrylonitrile can be reacted in the presence of an alkaline condensing agent with a ketone having an active methyl, methylene, or methenyl group immediately adjacent to the carbonyl group. The reaction results in a beta-cyanoethyl radical being attached to the carbon atom adjacent to the carbonyl group. Ketones which can be reacted in this manner include acetone, phenoxyacetone, cyano-acetone, ethoxy-acetone, acetophenone, p-methyl-acetophenone, acetyl-p-cymene, and the like. The polycarboxylic acid salt is then produced by saponification or hydrolysis.

The polycarboxylic acids and water-soluble salts thereof used in the present invention may be prepared by reacting acetone in the presence of a strongly basic alkaline catalyst with sufficient acrylonitrile to introduce at least 5 and preferably 6 beta-cyanoethyl groups into the acetone molecule. Catalysts useful for this purpose are the alkali metals and their oxides, hydroxides, alkoxides, and hydrides, as well as strongly basic quaternary ammonium hydroxides and alkoxides. One or several of these materials may be suspended or dissolved in acetone or in a solution of acetone in an inert liquid which is less reactive than the reacting acetone, such as tertiary butyl alcohol. The quantity of strongly basic alkaline catalyst necessary for the reaction is between about 0.5 and 2.0 percent of the combined weight of the reactants. Preferably, about 1.0 percent is utilized.

The amount of acrylonitrile necessary to react with acetone to produce 5 to 6 beta-cyanoethyl groups on the acetone molecule will, of course, vary with the temperature and time of the reaction, as well as the selected solvent system and catalyst. However, good yields of 5 and 6 beta-cyanoethylated acetone can be successfully obtained by utilizing about 350 grams of acrylonitrile dissolved in about 120 grams of tertiary butyl alcohol, for each gram mole of acetone.

The reaction between acetone and acrylonitrile takes place readily at temperatures during the first half of the reaction about 25° C to about 35° C, preferably at 30° C. During the second half of the reaction, temperatures between about 50° C and 65° C are utilized, preferably 60° C. The reaction has been found to be exothermal so that cooling, at least during the initial part of the reaction, may be advantageous in order to control the vigor of the reaction and to prevent undesired polymerization or side reactions.

The reaction which occurs with five moles of acrylonitrile is:

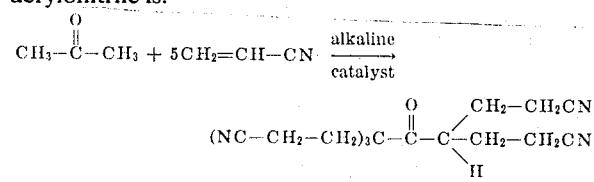

Similarly, acetone combines with 6 moles of acrylonitrile to give:

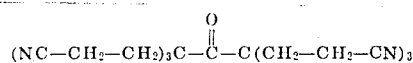

These cyanoethylation products are then saponified to the corresponding polycarboxylic acid salts by reacting with, for example, an aqueous alkali metal hydroxide, such as a sodium or potassium hydroxide solution to "split off" ammonia as completely as possible, giving a water soluble salt. For example, in the case of the preparation of the sodium salt the reaction would be as follows:

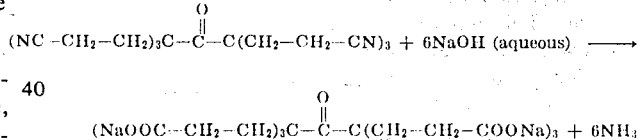

Any free alkali can be neutralized with strong acids such as sulfuric or hydrochloric acid since the presence of minor amounts of alkali metal sulfates or chlorides in the dried finished product is tolerated. The solvent may also be evaporated off to leave behind the non-volatile salt of the polycarboxylic acid.

The water-soluble alkali metal salts of the polycarboxylic acids prepared as above described can, if desired, contain more than one species of alkali metal cation. For example, in the case of beta-(hexacarboxyethyl)-acetone, four of the six carboxyl groups can be neutralized with sodium hydroxide. Of the remaining two carboxyl groups, one each can be neutralized with potassium hydroxide and lithium hydroxide. For most scale treatment processes, the hexa-sodium salt of hexacarboxyethylacetone, the penta-sodium salt of pentacarboxyethylacetone, and mixtures thereof are preferred because of low cost and efficiency. However, other water-soluble salts may also be used. For example, sodium, potassium, lithium, ammonium, ethanolammonium, diethanolammonium, triethanolammonium, cyclohexylammonium, morpholinium, piperidinium, hydrazinium, benzyl ammonium, and the like, may also be successfully used.

The amount of this material necessary to inhibit or remove scale will vary depending upon the particular application at hand. In our laboratory threshold test, described in detail in Example II, we have found that levels as low as 5 ppm of a 20 percent active aqueous solution will be sufficient to significantly reduce the scale on surface of testing apparatuses. However, an increased treatment level may be desirable when encountering extreme scale conditions. For example, when using the material in connection with, for example, floodwater operations, treatment levels as high as 50 to 200 ppm may be desirable or necessary.

The process of inhibiting and removing scale of the present invention utilizes the above described composition and comprises introducing the composition onto the surface area to be protected such as the internal metallic tubing or lining of boilers, in the form of an aqueous solution in an amount sufficient to inhibit or remove the scale and generally provide from about 5 ppm to about 200 ppm of the solution and maintaining the composition in contact with the surfaces for a period sufficient to inhibit the development of scale desposits thereon or to remove said scale deposit therefrom. It may be desirable to circulate the composition through the treated system to provide sufficient contact of the composition with the surface to be protected. For example, underground strata surrounding a well bore can be treated by passing an aqueous solution of the composition into the strata by injection of the solution down through the bore hole or production tubing, preferably under pressure.

The following examples further illustrate the preparation and use of our composition and process.

EXAMPLE I

The present example illustrates the preparation of the present scale inhibition composition utilized in the present process. Into a one liter 3-neck flask fitted with a stirrer, thermometer, funnel and reflux condenser, was added a solution of 40 grams of tertiary butyl alcohol, 29 grams acetone and 10 grams of 5 percent potassium hydroxide in a solution of 95 percent tertiary butyl alcohol. To this solution was added dropwise a solution of 70 grams tertiary butyl alcohol and 170 grams of acrylonitrile. Intermittent cooling was required because of an observed vigorous exotherm. 15% of the acrylonitrile solution was added at a temperature of about 20° C ± 2° C. The next 20 percent of the acrylonitrile solution was added at 30° C to 35 °C. After one hour of acrylonitrile addition, the reaction was "aged" for 1 hour. Ten grams of 5 percent potassium hydroxide in 95 percent tertiary butyl alcohol was then added as additional catalyst. The reaction temperature was then raised to 55° C. The remainder of the acrylonitrile solution was then added over a period of about 75 minutes. During this period, additional heating was required to maintain the reaction temperature at about 55° C – 60° C. The reaction batch was then permitted to "age" for 2 ½ hours at about 60° C to 70° C.

The solvent and volatiles were distilled from the cyanoethylated material and the residue was hydrolyzed by adding 130 grams of sodium hydroxide dissolved in 705 grams of water. The batch was heated to reflux at 95° C at which point vigorous ammonia evolution was noted. The reflux was continued for 3 hours until the ammonia in the overhead was negligible and the terminal pot temperature was between 105° C – 110° C. Reflux was then continued for 3 additional hours to complete the hydrolysis with intermittent distillate removal. Three additional hours of reflux were required to insure the absence of nitrogen. The pH of the material was adjusted to about 9 with concentrated hydrochloric acid.

EXAMPLE II

A standard calcium sulfate threshold performance test was conducted utilizing a 20 percent solution of the sodium salt of the composition, made as in Example I in ppm levels of 0 (blank), 5, 10, 15, 20, 50, 100, and 200, respectively. 100 CC of a solution containing 20.9 grams of $Na_2SO_4$ and 200 grams NaCl per liter was prepared and added to 8 ounce test bottles. To the test bottles was then added 100CC of a solution containing 21.9 grams of $CaCl_2 \cdot 2H_2O$ and 200 grams of NaCl per liter. A clean glass microscope slide was then inserted into each bottle. The bottles were capped and tightened to avoid moisture loss upon heating. The bottles were then placed in a preset 70° C oven for approximately 18 hours. After this period, the bottles were removed and the cells, slides and solution surface were examined for the presence of calcium sulfate scale. The test results were reported as "scale," "trace scale," or "clean" and is related to the ppm level of inhibitor in solution. The calcium sulfate threshold concentration of the test chemical is the concentration required to maintain a completely crystal free test solution. The results of this test indicated that the composition utilized in the present process effectively prevented scale at the 10 ppm concentration and was satisfactory at the 5 ppm level. The following table further illustrates the result of this test:

TABLE 2

| Treatment | PPM | Observations |
|---|---|---|
| Blank | | Scale on cell, slide and surface of solution |
| Compo. of Example 1 | 5 | Small crystal on surface of solution only |
| | 10 | No scale |
| | 15 | No scale |
| | 20 | No scale |
| | 50 | No scale |
| | 100 | No scale |
| | 200 | No scale |

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. A process for inhibiting the formation of scale on a surface in contact with an aqueous system containing chemicals having a tendency to form said scale which process comprises contacting said surface in an effective scale removing amount with an aqueous solution of a composition having the formula $$R-\underset{\underset{R}{|}}{\overset{\overset{R}{|}}{C}}-\overset{\overset{O}{\|}}{C}-\underset{\underset{Y}{|}}{\overset{\overset{R}{|}}{C}}-R$$

wherein R is —$CH_2$—$CH_2$—COOX, X being a member selected from the class consisting of hydrogen, alkali metals, ammonium and substituted ammonium, and Y is selected from the class consisting of hydrogen and — $CH_2$—$CH_2$—COOX, X being a member selected from the class consisting of hydrogen, alkali metals, ammonium and substituted ammonium.

2. The process of claim 1 wherein the scale inhibiting amount of said composition is from about 5 ppm to about 200 ppm.

3. The process of Claim 1 wherein said aqueous system is a brine.

4. The process of Claim 1 wherein said aqueous system is water.

5. The process of Claim 1 wherein R is —$CH_2$—$CH_2$—COONa and Y is selected from the class consisting of H and —$CH_2$—$CH_2$—COONa.

6. The process of claim 1 wherein R is —$CH_2$—$CH_2$—COOX, X being a member selectef from the class consisting of hydrogen, alkali metals, ammonium, substituted ammonium, and mixtures thereof, and Y is selected from the class consisting of hydrogen and — $CH_2$—$CH_2$—COOX, X being selected from the class consisting of hydrogens, alkali metals, ammonium, substituted ammonium, and mixtures thereof.

7. The process of claim 1 wherein said surface is the internal metallic lining of a steam boiler.

8. The process of claim 1 wherein said surface is a subterranean formation.

9. The process of claim 1 wherein said surface is the internal lining of an evaporator.

10. The process of claim 1 wherein the scale is calcium carbonate.

11. The process of claim 1 wherein the scale is calcium sulfate.

12. The process of claim 1 wherein the scale is barium sulfate.

13. The process of claim 1 wherein the scale is aluminum silicate.

14. A process for the removal of scale selected from the class consisting of alkaline earth metal salts and aluminum silicate on a surface in contact with an aqueous system containing chemicals forming said scale which process comprises contacting said surface in an effective scale removing amount with an aqueous solution of a composition having the formula $$R-\underset{\underset{R}{|}}{\overset{\overset{R}{|}}{C}}-\overset{\overset{O}{\|}}{C}-\underset{\underset{Y}{|}}{\overset{\overset{R}{|}}{C}}-R$$

wherein R is —$CH_2$—$CH_2$—COOX, X being a member selected form the class consisting of hydrogen, alkali metals, ammonium and substituted ammonium, and Y is selected from the class consisting of hydrogen and — $CH_2$—$CH_2$—COOX, X being a member selected from the class consisting of hydrogen, alkali metals, ammonium and substituted ammonium.

15. The process of claim 14 wherein the scale removing amount is from about 5 ppm to about 200 ppm.

16. The process of claim 14 wherein said aqueous system is a brine.

17. The process of claim 14 wherein said aqueous system is water.

18. The process of claim 14 wherein R is —$CH_2$—$CH_2$—COOX, X being a member selected from the class consisting of hydrogen, alkali metals, ammonium, substituted ammonium and mixtures thereof, and Y is selected from the class consisting of hydrogen and — $CH_2$—$CH_2$—COOX, X being selected from the class consisting of hydrogen, alkali metals, ammonium, substituted ammonium, and mixtures thereof.

19. The process of claim 14 wherein said surface is the internal metallic lining of a steam boiler.

20. The process of claim 14 wherein said surface is a subterranean formation.

21. The process of claim 14 wherein said surface is the internal lining of an evaporator.

22. The process of claim 14 wherein the scale is calcium carbonate.

23. The process of claim 14 wherein the scale is calcium sulfate.

24. The process of claim 14 wherein the scale is barium sulfate.

25. The process of claim 14 wherein the scale is aluminum silicate.

26. The process of claim 14 wherein R is —$CH_2$—$CH_2$—COONa and Y is selected from the class consisting of H and —$CH_2$—$CH_2$—COONa.

* * * * *